(12) United States Patent
Feinstein

(10) Patent No.: US 8,719,172 B1
(45) Date of Patent: May 6, 2014

(54) HIDING ORDER DETAILS

(75) Inventor: Brian J. Feinstein, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 383 days.

(21) Appl. No.: 12/855,759

(22) Filed: Aug. 13, 2010

(51) Int. Cl.
*G06F 21/10* (2013.01)

(52) U.S. Cl.
USPC .............................................. 705/76; 705/50

(58) Field of Classification Search
None
See application file for complete search history.

(56) References Cited

U.S. PATENT DOCUMENTS

2005/0154652 A1* 7/2005 Bezos et al. .................... 705/27
2010/0131769 A1* 5/2010 Homma ........................ 713/176

\* cited by examiner

*Primary Examiner* — Calvin L Hewitt, II
*Assistant Examiner* — Tim Hale
(74) *Attorney, Agent, or Firm* — Thomas | Horstemeyer, LLP

(57) ABSTRACT

Systems and methods for hiding details associated with orders in an electronic commerce system are disclosed. An order is submitted by a user associated with a user account, and the order is processed by the electronic commerce system. A security measure can be imposed on the order and/or products associated with the order. An additional authentication layer can be enforced with regard to the order and/or products associated with the order.

17 Claims, 7 Drawing Sheets

Check Out   Account: John Doe

| Shipping | Payment |
|---|---|
| John Doe<br>123 Main Street<br>Town City, KS | $1089.98 to<br>Credit Card:<br>XXXXXX1234 |

Submit

| Performance Shirt | $89.99 | Is this a gift? ☒ |
| Flat TV | $999.99 | Is this a gift? ☐ |

Check Out   Account: John Doe

Would you like to password protect this order?

Gift Items ☒

Entire Order ☐

Submit

| Performance Shirt | $89.99 | Is this a gift? ☒ |
| Flat TV | $999.99 | Is this a gift? ☐ |

Order Security Measure - Gift   Account: John Doe

| Shipping | Payment |
|---|---|
| John Doe<br>123 Main Street<br>Town City, KS | $1089.98 to<br>Credit Card:<br>XXXXXX1234 |

Performance Shirt   $89.99

Choose Password: [　　　　　]

Hide:
- Item ☒
- Price ☒
- Tracking Information ☐
- Gift Recipient ☐

Gift Recipient:
(enter name or account ID)   [Jane Doe]

(Submit)

Order History                                    Account: John Doe

| Orders |
|---|

1/5/2004        Total: $45.00
3/4/2005        Total: $8.99
5/4/2007        Total: (hidden) – select for additional information
                                                              601

Order Detail – 5/4/2007                          Account: John Doe

Shipping Address

John Doe
123 Main Street        Tracking Number    1zzr3566dd3kiu1
Town City, KS (Item Hidden)              (Price Hidden)

Enter Order
Gift for Jane Doe!                  Password to
                                    Reveal Flat TV                    $999.99

Order Detail – 5/4/2007                    Account: John Doe

Shipping Address

```
┌─ ─ ─ ─ ─ ─ ─ ┐
│ John Doe      │
│ 123 Main Street│   Tracking Number    1zzr3566dd3kiu1
│ Town City, KS │
│               │   Item has been delivered, gift items revealed
└─ ─ ─ ─ ─ ─ ─ ┘
```

Performance Shirt         (Price Hidden)

Gift for Jane Doe!

Flat TV                   $999.99

Order History                              Account: John Groe

| Orders |
|---|

12/1/2006        Total: $1210.50
5/4/2007         Total: (hidden) – John Doe has given you a gift!
                  select for additional information 126h

FIG. 9

HIDING ORDER DETAILS

BACKGROUND

Users of an electronic commerce system may often share an account associated with the system. Users may, in some cases, purchase a gift for another user via an electronic commerce system. If one or more users share an account or share credentials for accessing the account, any user possessing the credentials or having access to the account may be able to view the item ordered. In the case of a gift, users may desire to place an additional layer of security or obfuscation atop an order in an order history associated with the account.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2-9 are drawings of example of user interfaces rendered by a client in the networked environment of FIG. 1 according to various embodiments of the present disclosure.

DETAILED DESCRIPTION

In the following discussion, first a general description of the system and its components is provided, followed by a discussion of the operation of the same. Disclosed herein are systems and methods of hiding and/or concealing order details within a user account associated with an electronic commerce system. Embodiments of this disclosure can also facilitate assigning one or more products associated with an order in an electronic commerce system from a first user to a second user and hiding and/or concealing details of the order. Hiding and/or concealment of order details can, in some embodiments, be employed in the context of giving a gift from a gift giver to another user of the electronic commerce system or to another person that may have access to a user account of the gift giver, where the gift giver desires to hide or conceal items that are intended as gifts.

Figure 1:
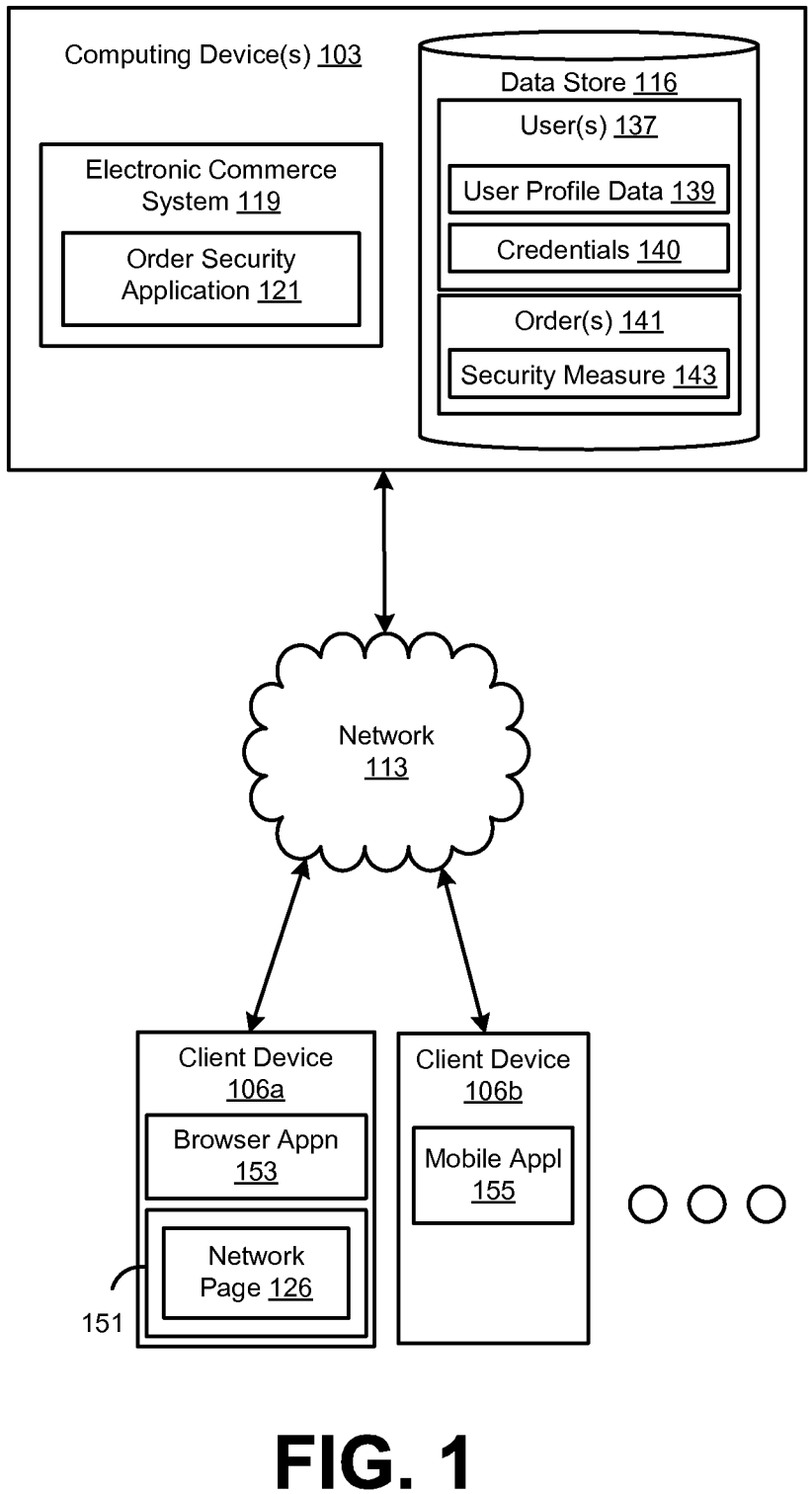
FIG. 1 is a drawing of a networked environment according to various embodiments of the present disclosure.

With reference to FIG. 1, shown is a networked environment 100 according to various embodiments. The networked environment 100 includes at least one computing device 103 in communication with at least one client device 106a/106b. The network 113 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. As one example, each of the disclosed components executed in the computing device 103 can be executed in different computing devices 103 in various locations in one or more data centers. However, for purposes of convenience, the computing device 103 is referred to herein in the singular. Even though the computing device is referred to in the singular, it is understood that a plurality of computing devices 103 may be employed in the various arrangements as described above.

The components executed on the computing device 103 include, for example, an electronic commerce system 119, an order security application 121, and other systems, applications, services, processes, engines, or functionality not discussed in detail herein. The electronic commerce system 119 is executed in order to facilitate the viewing and/or purchasing of items and products over the network 113. Accordingly, the electronic commerce system 119 can allow a merchant to set pricing for the various items and products as well as process payments submitted or authorized by users to make purchases. The electronic commerce system 119 can direct the shipment and/or delivery of products to a customer from a fulfillment center or the like. The electronic commerce system 119 also performs various backend functions associated with the online presence of a merchant in order to facilitate the online purchase of items.

For example, the electronic commerce system 119 generates network pages, such as web pages or other types of network content, that are provided to client devices 106a/106b in response to requests for the purposes of selecting items for purchase, rental, download, lease, or other form of consumption and to perform other tasks as will be described. In other embodiments, the electronic commerce system 119 facilitates the generating of data for display on a user interface rendered by another type of application executed on a client device 106a/106b. Additionally, the electronic commerce system 119 can facilitate access by a user to a user account, which may contain profile data and other user specific data. The electronic commerce system 119 can facilitate the storage of shipping information, payment information, order history and other data with respect to the various user accounts. Accordingly, the electronic commerce system 119 can require a user to submit credentials that it can authenticate in order to provide access to a user account.

The order security application 121 facilitates providing an additional security measure with respect to orders submitted by a user and processed by the electronic commerce system 119. A user can request a security measure generated by the order security application 121, as discussed herein, so that the electronic commerce system 119 can require an additional level of authentication in order to access details regarding a particular order associated with a user account. In other words, a user may desire to hide and/or conceal order details from another user that may also have access to the same user account. The hidden and/or concealed order details can be revealed upon providing a password and/or other additional security measure as specified by the order security application 121.

The hiding and/or concealment of certain order details, such as the identity and/or price of a product in an order, can be useful in the context of purchasing a product via the electronic commerce system 119 as a gift. In such a scenario, it is possible that multiple users may have access to a single user account in the electronic commerce system 119. Accordingly, in one example, a user purchasing a gift via such a user account may wish to associate a security measure with an order that contains an item intended as a gift for another user with whom access to the user account is shared. In other words, a user may purchase a gift via the electronic commerce system 119 for someone with whom credentials for a user account in the electronic commerce system 119 are shared.

With regard to the data store 116, the data stored therein can include, for example, a catalog that includes a listing of various products that are available for browsing and/or purchasing within the electronic commerce system 119. The data store 116 can also include a user table 137 that may contain data associated with a user account. In the depicted non-limiting example, the user table 137 can include user profile data 139 as well as data regarding credentials 140 that a user provides in order to gain access to the user account. The user profile data 139 can include data regarding orders submitted by users with access to a particular user account (e.g., an order history) as well as other user account specific data such as credit card information, other payment information, shipping address, and other data as can be appreciated. In one embodiment, the credentials 140 can include a username and password that a user must provide in order to gain access to the user account. In other embodiments, the credentials 140 can include data regarding other authentication mechanisms with which a user can gain access to the electronic commerce system, such as a smart card, fingerprint, voice imprint, etc.

The data store 116 can also include an order table 141 that contains data regarding orders that can be associated with one or more users of the electronic commerce system 119. The order table 141 can include order details regarding orders submitted by users to purchase products via the electronic commerce system 119 by accessing the electronic commerce system 119 with a user account. In this way, an order history can be maintained by the data store 116. Orders stored in the order table 141 can also be associated with a security measure 143 that can require an additional layer of authentication in order to access the order details stored in the order table 141. Order details can include products associated with an order, product pricing associated with the order, payment terms, shipping terms, shipping addresses, whether one or more products associated with an order is a gift, an identity of a gift recipient, and other order specific data as can be appreciated.

The data store 116 can also include other data that may be employed to facilitate an electronic commerce system 119, but such data is not discussed in detail herein. Additionally, it should be appreciated that the data store 116 can be implemented in a separate computing device that may be located in a separate installation or location. The depicted table structure of the data store 116 is one example of how data can be structured therein according to embodiments of this disclosure, as it should be appreciated that data can be structured in many different ways across multiple data stores implemented in various computing devices.

The client device 106a/106b is representative of a plurality of client devices 106a/106b that may be coupled to the network 113. The client device 106a/106b may comprise, for example, a processor-based system such as a computer system. Such a computer system may be embodied in the form of a desktop computer, a laptop computer, a personal digital assistant, a mobile device (e.g. cellular telephone, smart phone, etc.), set-top box, music players, web pads, tablet computer systems, or other devices with like capability. The client device 106a includes a display device 151 upon which various network pages 126 and other content may be rendered.

The client device 106a may be configured to execute various applications such as a browser application 153 and/or other applications. The browser application 153 may be executed in a client device 106a, for example, to access and render network pages 126, such as web pages, or other network content served up by the computing device 103 and/or other servers. The client device 106a may be configured to execute applications beyond browser application 153 such as, for example, an email client for receiving email generated by the electronic commerce system 119, instant message applications, an application specifically tailored to access resources of the computing device 103, and/or other applications as can be appreciated. In embodiments of the present disclosure, a user on a client 106a/106b can purchase and/or view products via the electronic commerce system 119 executed by the computing device 103 by manipulating a user interface rendered on the client 106a/106b.

The client device 106b can also include a mobile device on which a browser application and/or a mobile application 155 configured to access the computing device 103 can be executed. The client device 106b may comprise a mobile device including cellular telephone, location detection hardware, and software components. The mobile application 155 can comprise a special purpose application tailored to interact with the electronic commerce system 119. As one example, the mobile application 155 can include client side code that enhances a user experience by providing more complex user interface elements and other functionality and facilitates interaction with the electronic commerce system 119.

Next, a general description that provides some examples of the operation of the various components of the networked environment 100 is provided. The following discussion includes non-limiting examples of the hiding and/or concealment of orders and/or order details associated with a user account by imposing a security measure 143 on one or more aspects of an order. Additionally, embodiments of this disclosure can facilitate assigning an order or products within an order to other users of the electronic commerce system 119, with access to the order details associated with the order regulated by the security measure 143 as described herein. In this way, in one example, a user of a user account in an electronic commerce system 119 can designate one or more products associated with an order as a gift for a user associated with a different user account, and the order security application 121 can associate the gift with the different user account while enforcing a security measure 143 specified by the gift giver.

A user accessing the electronic commerce system 119 via a user account can purchase products by submitting an order via user interfaces provided by the electronic commerce system 119 that are rendered on a client device 106a/106b. Because, in one example, multiple users may share access to a particular user account, which can provide access to an order history associated with the user account, a user submitting an order can designate a security measure 143 associated with the order, which an additional layer of authentication that is required in order to access one or more order details associated with the order. The order security application 121 can facilitate generation and enforcement of such a security measure 143.

In one embodiment, a user submitting an order via the electronic commerce system 119 can specify an additional password, passphrase, and/or other authentication mechanism that a user must supply, in addition to a set of credentials 140 supplied to gain access to a user account, in order to view details regarding an order. As noted above, such a security measure 143 can be useful in the case of multiple users who may share access to a particular user account as well as a set of credentials 140 used to access the electronic commerce system 119, and where one of these users wishes to purchase a gift for one of the other such users. Accordingly, a security measure 143 can specify whether access to all or part of an order requires additional authentication as well as specify the type of authentication required. When submitting an order and defining a security measure 143 via the order security application 121, a user of a user account can, in one embodiment, define a password that can be temporary in nature and/or specific to the particular order and/or portion of an order to which it applies.

In some embodiments, the order security application 121 can generate a password to use as a security measure on behalf of the user. In other embodiments, this automatically generated password can be a randomized password. In yet other embodiments, the order security application 121 can employ as a security measure a challenge-response authentication protocol. In one embodiment, the order security application 121 can allow a user to select an image that can act as a security measure. When the user subsequently attempts to access order details related to the order, the order security application 121 can present a plurality of images, and the user must select the image the user initially chose as the security measure in order to view the hidden order details.

As one example, a security measure 143 can be applied globally to an order so that the electronic commerce system 119 and/or order security application 121 can require a password from a user of a user account in order to view any order details regarding the order. As another example, a security measure 143 can be applied to a subset of the products associated with an order so that the electronic commerce system 119 and/or order security application 121 can require the authentication specified by the security measure 143 in order to access order details related to the subset of the products.

In the context of the above-described gift scenario, the security measure 143 can adapt over time. The security measure 143 can specify that certain order details can be revealed to a user of a user account without the additional layer of authentication specified by the security measure 143 after a predetermined period of time has expired or other conditions have been met. In some embodiments, if one or more products associated with an order are designated as a gift, the order security application 121 can detect when such designated products have been shipped and/or arrived at their destination, and then reveal certain order details without requiring additional authentication. As one example, the order security application 121 can retrieve shipment tracking data associated with shipment of a product in an order that is designated as a gift, and then reveal the identify of the product to a user of a user account who does not supply authentication specified by the security measure 143, but keep the order pricing of the product concealed to such a user.

In some embodiments, a user submitting an order via the electronic commerce system 119 can designate one or more products associated with the order as a gift intended for a user associated with a different user account. Accordingly, the electronic commerce system 119 and/or order security application 121 can assign and/or associate the products in an order that are designated as gifts for the gift recipient with a user account associated with the gift recipient. As noted above, a user accessing the electronic commerce system 119 via a user account and specify a security measure 143 associated with the order and/or products in the order, and the security measure 143 can be enforced when the gift recipient attempts to view order details associated with such an order.

FIGS. 2-9 depict various user interfaces that illustrate in further detail how embodiments of the present disclosure can impose a security measure 143 on an order and/or a subset of an order to protect, conceal and/or hide order details from a user accessing a user account with credentials 140 of the user account from which the order was placed. Additionally, the depicted user interfaces also depict how embodiments of the present disclosure can protect, conceal and/or hide order details from a user accessing a different user account to which an order and/or products have been assigned, as in the gift context.

Therefore, reference is now made to FIGS. 2-9, which depicts an example of a user interface generated by the electronic commerce system 119 that can be rendered on a client device 106a/106b according to an embodiment of this disclosure. In the depicted non-limiting example, the user interface can comprise a network page 126 that is rendered by a browser application 153 executed on a client device 106a. In another embodiment, the user interface can comprise an image viewer in a mobile application 155 executed on a client device 106b that is a mobile device. As noted above in reference to FIG. 1, the order security application 121 can facilitate creation and/or enforcement of a security measure 143 associated with an order and/or products within an order.

Figure 2:
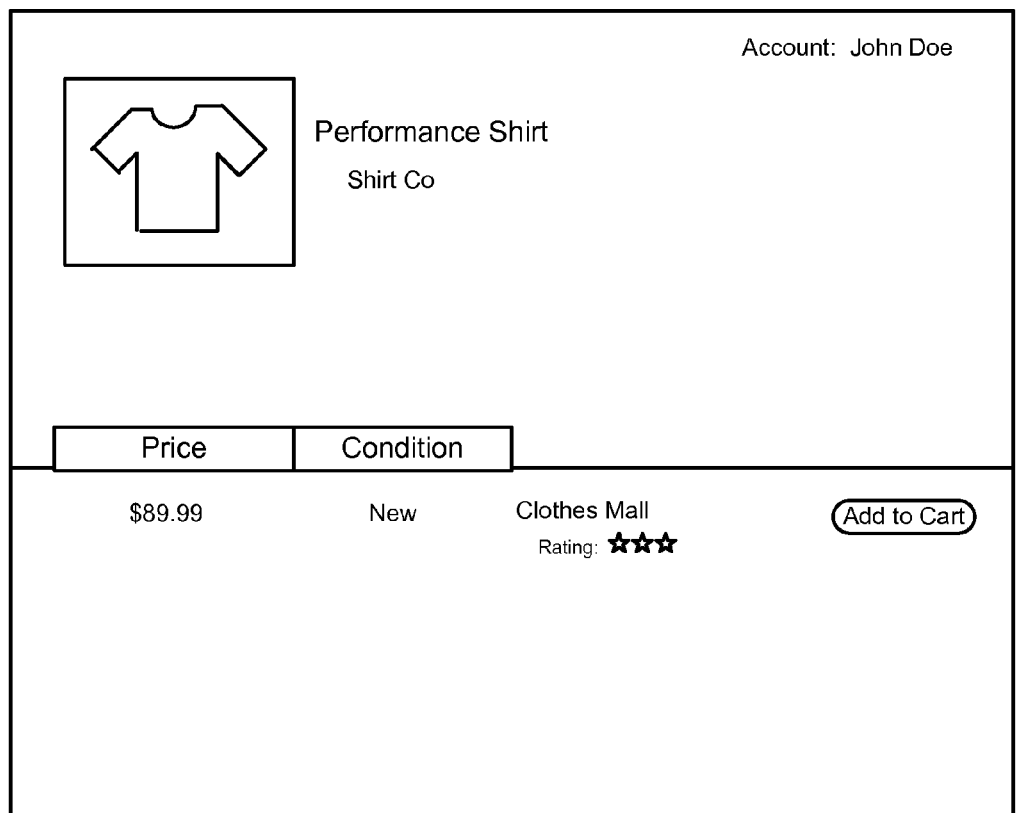

The depicted network page 126a of FIG. 2 is a product detail page from which a user can purchase a product or add the product to a shopping cart associated with a session in an electronic commerce system 119. The product detail page can facilitate the submission of an order for the depicted product from a user associated with a user account. Other variations of user interfaces that facilitate submission of an order for one or more products via an electronic commerce system 119 should be appreciated, and it should also be appreciated that the depicted network page 126a of FIG. 2 is shown merely to illustrate the functionality of the order security application 121.

Continuing the example of FIG. 2, reference is now made to FIG. 3, which depicts an alternative network page 126b that can be generated by the electronic commerce system 119 further into an order workflow. The depicted check out user interface allows a user submitting an order via the electronic commerce system 119 to specify and/or view various order details. The order details can include a shipping address, payment information, product pricing associated with the items in the order, and other order details related to a check out process as can be appreciated. Additionally, the depicted check out user interface allows a user to designate one or more products associated with the order as a gift item. Accordingly, a user can manipulate the gift user interface element 301 to designate an item in an order as a gift. If one or more products associated with an order are designated as gifts, then the order security application 121 and/or electronic commerce system 119 can determine whether the user desires to impose a security measure 143 on the order and/or products within the order. This functionality is discussed in more detail with reference to FIG. 4.

Accordingly, reference is now made to FIG. 4, which continues the example of FIGS. 2 and 3. In the depicted network page 126c, the order security application 121 and/or electronic commerce system 119 can generate the depicted order security measure user interface to facilitate entry of a security measure 143 associated with the order as a part of the check out workflow. It should be appreciated that in some embodiments, the order security application 121 can facilitate creation of a security measure 143 associated with an order and/or products within an order apart from a check out workflow or check out user interface, and that the depicted user interface is but one example.

Returning to the depicted example of FIG. 4, the order security application 121 can facilitate creation by a user of a security measure 143 associated with a product in the order shown in the example by manipulating the depicted user interface elements to indicate that the user to password protect the order. The order security application 121 can also allow the user to password protect the entire order or items within the order that are designated as gifts.

Continuing the example of FIG. 4, reference is now made to FIG. 5, which depicts a network page 126d generated by the electronic commerce system 119 and/or order security application 121 that allows a user submitting an order in the electronic commerce system 119 via a user account to define the various aspects of a security measure 143. As depicted in the example of FIG. 4, a user can designate a security measure 143 as applicable to an entire order or products within the order. Therefore, it should be appreciated that the example of FIG. 5 depicts but one way in which a user interface can facilitate definition of the various aspects of a security measure 143.

Accordingly, if the user selects a particular product within an order to which a security measure 143 should be applied, the electronic commerce system 119 and/or order security application 121 can an additional authentication layer the user wishes to impose for accessing order details. In the depicted example, a password and/or passphrase can be defined by the user that is used for accessing the order details associated with the depicted order. Additionally, the user can select which of the various details associated with an order the user desires to hide and/or conceal with a security measure 143. The user can also designate a name of the gift recipient and/or identifier associated with a user account in the electronic commerce system 119 for the gift recipient.

Reference is now made to FIG. 6, which continues the example of FIG. 5. FIG. 6 depicts a network page 126e that illustrates one way in which order details protected by a security measure 143 can be hidden and/or concealed from a user that may have access to a user account from which the order was submitted to the electronic commerce system 119. As noted above, multiple users may often share a single user account, which provides access to an order history associated with the user account. Accordingly, the security measure 143 provides an additional authentication layer associated with order should the user desire to impose such an additional layer. In the depicted example, the depicted order details 601 are hidden and/or concealed from a user accessing a user account from which the order was submitted.

FIG. 7 continues the example of FIG. 6, which illustrates enforcement of a security measure 143 by the order security application 121. In the network page 126f of FIG. 7, a user accessing a user account from which the order was submitted is prompted to supply credentials associated with an additional authentication layer enforced by the order security application 121. In the depicted example, the user is prompted to supply an order password in order to view order details associated with a security measure 143.

Reference is now made to FIG. 8, which depicts a security measure 143 that can include certain temporary aspects. The depicted network page 126g illustrates that the order security application 121 is enforcing a security measure 143 that directs the order security application 121 to reveal an identity of the product to which the security measure 143 applies when the product is delivered to its destination shipping address. The network page 126 also depicts a security measure 143 can continue to enforce an additional authentication layer on a price associated with the product, even after its delivery to a destination address.

FIG. 9 depicts an alternative example of enforcement of a security measure by the order security application 121. In the depicted network page 126h, an order has been submitted to the electronic commerce system 119 by a user associated with a first user account. One or more products within the order have been designated as a gift to another user associated with a second user account. Accordingly, in this way, the product associated with the order can be assigned to the second user account, and can be displayed in an order history generated by the electronic commerce system 119 in a user interface encoded for display to a user accessing the electronic commerce system 119 via this second user account.

The security measure 143 defined by a user of the first user account can continued to be enforced by the order security application 121, and certain order details can require an additional authentication layer in order to access. The order security application 121 and/or electronic commerce system 119 can transmit a message to the second user account that informs a user that a gift has been made and an entry added to an order history associated with the second user account. In one embodiment, such a message can be displayed as a part of an order history generated by the electronic commerce system 119 and/or transmitted via electronic mail, short message service, or other mechanisms as can be appreciated.

Figure 10:
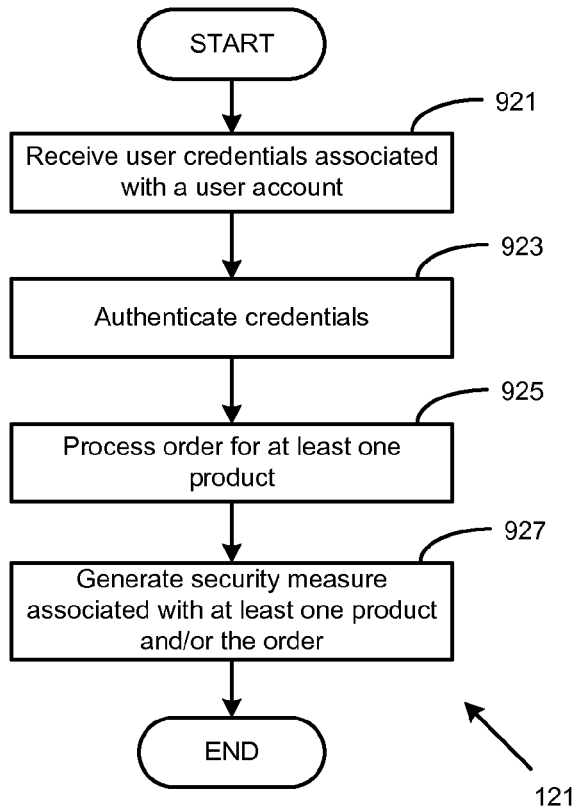
FIG. 10 is a flowchart illustrating one example of functionality implemented as portions of the order security application executed in a computing device in the networked environment of FIG. 1 according to various embodiments of the present disclosure.

With reference to FIG. 10, shown is a flowchart that provides one example of the operation of various embodiments of the order security application 121 according to various embodiments. It is understood that the flowchart of FIG. 10 merely provides examples of the many different types of functional arrangements that may be employed to implement the operation of the order security application 121 as described herein. As an alternative, the flowchart of FIG. 10 may be viewed as depicting examples of steps of methods implemented in the computing device 103 (FIG. 1) according to one or more embodiments.

With specific reference to FIG. 10, beginning with box 921, user credentials associated with a user account are received in the electronic commerce system 119 (FIG. 1). In box 923, the credentials associated with the user account are authenticated. In box 925, an order associated with the user account is processed. As noted above, the electronic commerce system 119 and/or order security application 121 can facilitate specifying a security measure 143 associated with the order and/or products within the order that requires an additional authentication layer for accessing details about the order. In box 927, the security measure 143 specified in the processing of the order is generated and associated with the order and/or products within the order.

Figure 11:
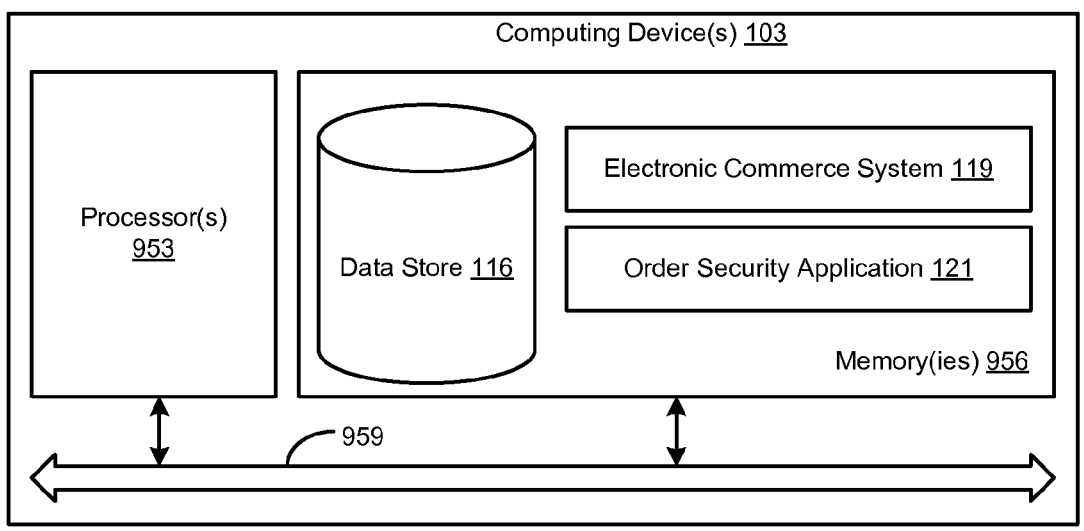
FIG. 11 is a schematic block diagram that provides one example illustration of a computing device employed in the networked environment of FIG. 1 according to various embodiments of the present disclosure.

With reference to FIG. 11, shown is a schematic block diagram of the computing device 103 according to an embodiment of the present disclosure. The computing device 103 includes at least one processor circuit, for example, having a processor 953 and a memory 956, both of which are coupled to a local interface 959. To this end, the computing device 103 may comprise, for example, at least one server computer or like device. The local interface 959 may comprise, for example, a data bus with an accompanying address/control bus or other bus structure as can be appreciated.

Stored in the memory 956 are both data and several components that are executable by the processor 953. In particular, stored in the memory 956 and executable by the processor 953 are the order security application 121, and potentially other applications. Also stored in the memory 956 may be a data store 116 and other data. In addition, an operating system may be stored in the memory 956 and executable by the processor 953.

It is understood that there may be other applications that are stored in the memory 956 and are executable by the processors 953 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 956 and are executable by the processor 953. In this respect, the term "executable" means a program file that is in a form that can ultimately be run by the processor 953. Examples of executable programs may be, for example, a compiled program that can be translated into machine code in a format that can be loaded into a random access portion of the memory 956 and run by the processor 953, source code that may be expressed in proper format such as object code that is capable of being loaded into a random access portion of the memory 956 and executed by the processor 953, or source code that may be interpreted by another executable program to generate instructions in a random access portion of the memory 956 to be executed by the processor 953, etc. An executable program may be stored in any portion or component of the memory 956 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 956 is defined herein as including both volatile and nonvolatile memory and data storage components. Volatile components are those that do not retain data values upon loss of power. Nonvolatile components are those that retain data upon a loss of power. Thus, the memory 956 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 953 may represent multiple processors 953 and the memory 956 may represent multiple memories 956 that operate in parallel processing circuits, respectively. In such a case, the local interface 959 may be an appropriate network 113 (FIG. 1) that facilitates communication between any two of the multiple processors 953, between any processor 953 and any of the memories 956, or between any two of the memories 956, etc. The local interface 959 may comprise additional systems designed to coordinate this communication, including, for example, performing load balancing. The processor 953 may be of electrical or of some other available construction.

Although the order security application 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 10 shows the functionality and operation of an implementation of portions of the order security application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 953 in a computer system or other system. The machine code may be converted from the source code, etc. If embodied in hardware, each block may represent a circuit or a number of interconnected circuits to implement the specified logical function(s).

Although the flowchart of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. Further, in some embodiments, one or more of the blocks shown in FIG. 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the order security application 121, that comprises software or code can be embodied in any non-transitory computer-readable medium for use by or in connection with an instruction execution system such as, for example, a processor 953 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    a non-transitory computer readable medium comprising an application executable by the at least one computing device, the application comprising code that, when executed by the at least one computing device, causes at least one processor of the at least one computing device to perform actions comprising:
        authenticating credentials of a user account, the user account associated with a user profile in an electronic commerce system;
        identifying an order in the electronic commerce system for at least one product, the order placed by a first user accessing the user account using the credentials associated with the user account in the electronic commerce system;
        designating the at least one product associated with the order as a gift;
        hiding an identity of the at least one product associated with the order that is designated as a gift;
        detecting when the at least one product designated as a gift arrives at a destination associated with the order;
        revealing the identity of the at least one product when the at least one product arrives at the destination; and
        associating a security measure with the order, the security measure requiring at least one additional level of authentication in addition to the credentials that are associated with accessing the order, wherein the at least one additional level of authentication is used before the gift arrives at the destination.

2. The system of claim 1, wherein the security measure further requires password authentication to access order details associated with the order, the password being different from the credentials and the order details including at least one of: a product description associated with the at least one product, a price associated with the at least one product, or shipping terms associated with the at least one product.

3. The system of claim 2, wherein the security measure hides at least a subset of the order details from a user accessing the user account with the credentials.

4. The system of claim 1, wherein the application further associates the order with a second user profile accessible to the electronic commerce system that is associated with a second user.

5. The system of claim 4, wherein the application associates the order with the second user profile associated with the second user by adding the order to an order history associated with the second user profile.

6. The system of claim 4, wherein the application associates the order with the second user profile associated with the second user transmitting a notification to the second user, the notification further comprising a message that the first user has assigned the at least one product to the second user.

7. The system of claim 6, wherein the notification further comprises another message informing the second user that the first user has made a gift of the at least one product to the second user.

8. A method, comprising the steps of:
    authenticating, by at least one computing device, credentials of a user account, the user account associated with a user profile in an electronic commerce system;
    identifying, by the at least one computing device, an order in the electronic commerce system for at least one product, the order placed by a first user accessing the user account using the credentials associated with the user account in the electronic commerce system;
    designating, by the at least one computing device, the at least one product associated with the order as a gift;
    hiding, by the at least one computing device, an identity of the at least one product associated with the order that is designated as a gift;
    associating, by the at least one computing device, a security measure with the order, the security measure requiring at least one additional level of authentication in addition to the credentials that are associated with accessing the order;
    detecting, by the at least one computing device, that the at least one product designated as a gift arrives at a destination associated with the order; and
    revealing, by the at least one computing device, the identity of the at least one product when the at least one product arrives at the destination.

9. The method of claim 8, wherein the security measure requires password authentication to access order details associated with the order, the password being different from the credentials and the order details including at least one of: a product description associated with the at least one product, a price associated with the at least one product, or shipping terms associated with the at least one product.

10. The method of claim 9, wherein the step of imposing the security measure further comprises the step of hiding, by the at least one computing device, at least a subset of the order details from a user accessing the account with the credentials.

11. The method of claim 8, further comprising the step of associating, by the at least one computing device, the order with a second user profile accessible to the electronic commerce system that is associated with a second user.

12. The method of claim 11, wherein the step of associating the order with the second user profile associated with the second user further comprises the step of adding, by the at least one computing device, the order to an order history associated with the second user profile.

13. The method of claim 11, wherein the step of associating the order with the second user profile associated with the second user further comprises the step of transmitting, by the at least one computing device, a notification to the second user, the notification further comprising a message that the first user has assigned the at least one product to the second user.

14. The method of claim 13, wherein the notification further comprises a message informing the second user that the first user has made a gift of the at least one product to the second user.

15. The method of claim 9, further comprising the steps of:
    detecting, by the at least one computing device, access of the user account by a third user using the credentials; and
    hiding, by the at least one computing device, the order from the third user.

16. The system of claim 1, wherein the application is further configured to perform actions comprising:

receiving the order associated with the user account for the at least one product; and processing the order for the at least one product.

17. The method of claim 8, further comprising the steps of:

receiving, by the at least one computing device, the order associated with the user account for the at least one product; and processing, by the at least one computing device, the order for the at least one product.

* * * * *